(No Model.)
L. H. TITUS.
FRUIT GATHERING SHEARS.
No. 354,363. Patented Dec. 14, 1886.
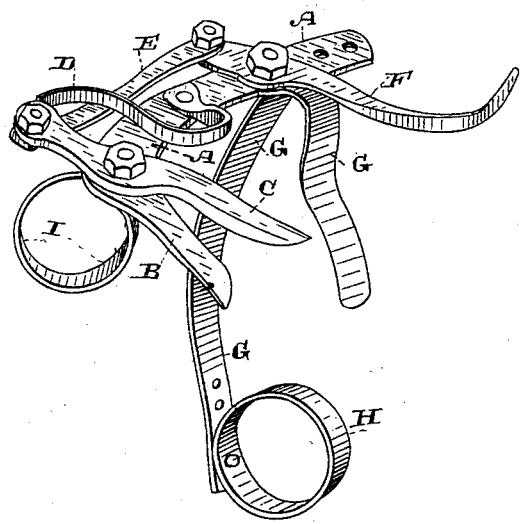
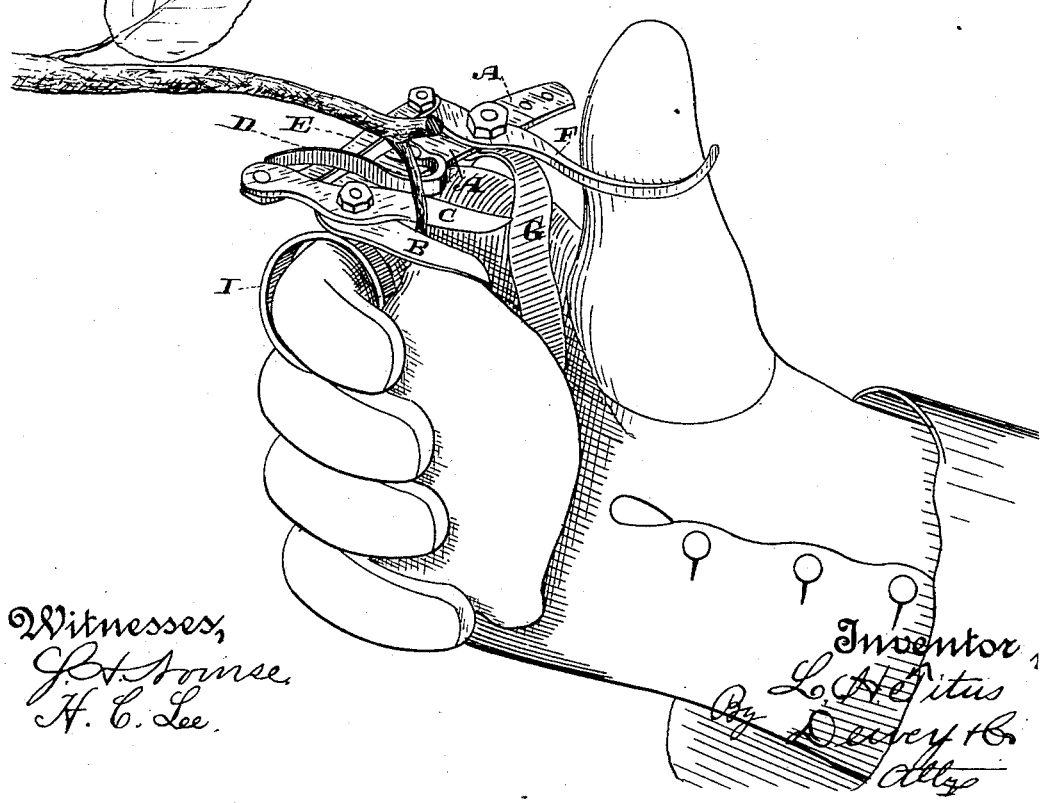
Witnesses,
Inventor,
L. H. Titus
By Dewey & Co.
Att'ys

UNITED STATES PATENT OFFICE.

LUTHER H. TITUS, OF LOS ANGELES, CALIFORNIA.

FRUIT-GATHERING SHEARS.

SPECIFICATION forming part of Letters Patent No. 354,363, dated December 14, 1886.

Application filed February 11, 1886. Serial No. 191,653. (No model.)

*To all whom it may concern:*

Be it known that I, LUTHER H. TITUS, of Los Angeles, Los Angeles county, State of California, have invented an Improvement in Fruit-Gathering Shears; and I hereby declare the following to be a full, clear, and exact description of the same.

My invention relates to a device for gathering fruit. It is especially intended for gathering such fruit as would be injured by falling or by rough or careless handling.

It consists of shears or a cutter mounted upon a frame with a spring, by which the blades may be opened or separated, and a lever by which they may be operated to close and cut, the frame being fitted to the hand in such a manner that it can be worn upon one hand and bring the cutter-blades in such a position that when the fruit is grasped in the hand the shears or cutters will be in position to sever the stem, leaving the fruit in the hand, ready to be deposited in the proper receptacle.

Referring to the accompanying drawings for a more complete explanation of my invention, Figure 1 represents a perspective view of a fruit-picker embodying my invention. Fig. 2 illustrates the application of the same to the hand.

A is the plate or bar, to one end of which one blade, B, of a pair of scissors may be fixed, and the other blade, C, is fulcrumed so as to operate upon it, having an arm projecting rearwardly from the fulcrum, so as to be acted upon by the spring D, which tends to keep the cutting-blades of the shears separated by its action. By means of a rod or link, E, this operating-arm of the movable blade is connected with the end of a lever-arm, F, which has its fulcrum upon the opposite end of the plate or frame to which the shear-blades are attached. Beyond this lever the plate is perforated with holes, and a band, G, is secured to this plate by bolt, screw, or rivet. This band may extend wholly or partially around the palm of the hand. In the present case I have shown a portion of it extending across the interior of the palm, and the remainder across the back of the hand or the fingers. At the end of this back portion is a ring, H, which is fitted to receive the little finger of the hand, and this back plate or portion is perforated with holes, so that the ring H may be attached at any desired point by means of a screw passing through these holes, it being thus adjustable to a wide or narrow hand at will. Near the point where the shear-blades are fulcrumed is another ring, I, of such a size and in such a relative position as to receive the forefinger of the hand, and by these rings, the band surrounding the hand, and the lever which is actuated by the thumb the whole device is securely held, so that the cutter or shear blades project over the inner part of the hand in such a position that when the orange or other fruit is grasped in the hand the thumb may be made to act upon the lever F, by which the shear-blades are closed, thus cutting off the stem and leaving the fruit in the hand. It is especially necessary that such fruit should be cut, instead of being pulled from the limbs, as in the latter case the stem is frequently pulled out, leaving a hole in the end of the fruit, which thus hastens its decay and prevents it keeping for a sufficient length of time to be transported to market and sold.

This device is especially useful, because all the work of holding and cutting the fruit may be done with one hand, and the operator, standing upon a step-ladder or other support within reach of the fruit, can reach to the extent of the arm on either side, gathering all fruit within reach, while steadying himself with the other hand.

Having thus described my invention, what I claim as new, and desire to secure by Letters Patent, is—

1. A plate or frame having one blade of a pair of cutting-shears fixed to it, a second blade fulcrumed upon the plate so as to open and close upon the fixed blade, with a spring acting upon the rearwardly-extending arm so as to hold the blades apart, in combination with a lever, F, fulcrumed to the frame and actuated by the thumb, and a link, E, by which the opposite end of this lever and the movable arm may be connected, substantially as herein described.

2. A plate having secured to it a pair of cutting-shears, a spring and operating-lever, and a ring for the forefinger, in combination with a band made adjustable upon this plate to fit different lengths of hand, and the ring H, fitted to said band, substantially as herein described.

3. A plate having cutting-shears fulcrumed upon it, together with an actuating-lever and a spring, and a ring for the forefinger of the hand, in combination with a band passing around the hand and adjustable upon this plate, and a ring adjustably secured to the outer end of this band for the reception of the little finger of the hand, substantially as herein described.

In witness whereof I have hereunto set my hand.

LUTHER H. TITUS.

Witnesses:
S. H. NOURSE.
H. C. LEE.